United States Patent
Chu et al.

(10) Patent No.: US 10,333,715 B2
(45) Date of Patent: Jun. 25, 2019

(54) PROVIDING COMPUTATION SERVICES WITH PRIVACY

(71) Applicant: International Business Machines Corporation, Armonk, NY (US)

(72) Inventors: Stephen Mingyu Chu, Beabercreek, OH (US); Tobias Enders, Mamaroneck, NY (US); Dong Sheng Li, Shanghai (CN); Pankaj Srivastava, Bedford, NY (US); Junichi Yan, Shanghai (CN); Tomomi Yoshioka, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 263 days.

(21) Appl. No.: 15/350,324

(22) Filed: Nov. 14, 2016

(65) Prior Publication Data

US 2018/0139054 A1    May 17, 2018

(51) Int. Cl.
*H04L 9/32*    (2006.01)
*H04L 9/00*    (2006.01)
(Continued)

(52) U.S. Cl.
CPC ............ *H04L 9/3247* (2013.01); *H04L 9/008* (2013.01); *H04L 9/14* (2013.01); *H04L 9/30* (2013.01);
(Continued)

(58) Field of Classification Search
CPC ... H04L 9/008; H04L 9/14; H04L 9/30; H04L 9/3247; H04L 9/088; H04L 63/06; H04L 63/083; H04W 12/04; H04W 12/06
See application file for complete search history.

(56) References Cited

U.S. PATENT DOCUMENTS

| | | | |
|---|---|---|---|
| 8,862,895 B2* | 10/2014 | Rieffel | H04L 9/008 380/28 |
| 9,031,229 B1* | 5/2015 | Nita | H04L 9/008 380/28 |

(Continued)

FOREIGN PATENT DOCUMENTS

WO    2016044129 A1    3/2016

OTHER PUBLICATIONS

Y. Kim and J. Heo, "Device authentication protocol for smart grid systems using homomorphic hash," in Journal of Communications and Networks, vol. 14, No. 6, pp. 606-613, Dec. 2012. (Year: 2012).*

(Continued)

*Primary Examiner* — Kari L. Schmidt
(74) *Attorney, Agent, or Firm* — Amin, Turocy & Watson, LLP

(57) ABSTRACT

Techniques are provided for providing a local computation service on client device authorized by a remote service provider while keeping local data private from the remote service provider. In one example, a computer-implemented method comprises transmitting, by a device operatively coupled to a processor, a homomorphic encryption public key and homomorphically encrypted input data to a service provider. The computer-implemented method also comprises receiving, by the device from the service provider, a homomorphically encrypted signature generated based on the homomorphic encryption public key, the homomorphically encrypted input data, and a homomorphic encryption equivalent defined function. The computer-implemented method also comprises in response to a determination, based on a defined function corresponding to the homomorphic encryption equivalent defined function, that the homomorphically encrypted signature and input data corresponding to the homomorphically encrypted input data are valid for a (Continued)

computation service, performing, by the device, the computation service on the input data.

20 Claims, 12 Drawing Sheets

(51) Int. Cl.
| | | |
|---|---|---|
| *H04W 12/04* | (2009.01) | |
| *H04L 9/30* | (2006.01) | |
| *H04L 29/06* | (2006.01) | |
| *H04L 9/14* | (2006.01) | |
| *H04W 12/06* | (2009.01) | |

(52) U.S. Cl.
CPC ............ *H04L 63/06* (2013.01); *H04L 63/061* (2013.01); *H04L 63/083* (2013.01); *H04L 63/0823* (2013.01); *H04L 63/10* (2013.01); *H04W 12/04* (2013.01); *H04W 12/06* (2013.01)

(56) References Cited

U.S. PATENT DOCUMENTS

| | | | | |
|---|---|---|---|---|
| 9,288,039 | B1* | 3/2016 | Monet | H04L 9/008 |
| 9,288,193 | B1* | 3/2016 | Gryb | H04L 63/08 |
| 9,436,835 | B1* | 9/2016 | Saldamli | G06F 21/602 |
| 9,787,647 | B2* | 10/2017 | Wu | H04L 63/0428 |
| 2005/0078825 | A1* | 4/2005 | Ohmori | G11B 20/00086 380/255 |
| 2006/0281442 | A1* | 12/2006 | Lee | H04L 9/3273 455/412.2 |
| 2007/0016528 | A1 | 1/2007 | Verhaegh et al. | |
| 2010/0229217 | A1* | 9/2010 | Bhatia | H04M 1/72525 726/1 |
| 2011/0153393 | A1* | 6/2011 | Raff | G06Q 10/06398 705/7.42 |
| 2011/0161658 | A1 | 6/2011 | Pashalidis | |
| 2013/0097417 | A1* | 4/2013 | Lauter | H04L 9/008 713/150 |
| 2013/0269020 | A1* | 10/2013 | Griffin | H04L 63/0884 726/9 |
| 2013/0326224 | A1* | 12/2013 | Yavuz | H04L 9/3247 713/176 |
| 2014/0187266 | A1 | 7/2014 | Nawaz et al. | |
| 2014/0298420 | A1* | 10/2014 | Barton | H04L 63/10 726/4 |
| 2014/0331272 | A1* | 11/2014 | Gupta | H04L 63/20 726/1 |
| 2014/0334622 | A1* | 11/2014 | Smyth | H04L 9/008 380/28 |
| 2015/0348335 | A1* | 12/2015 | Ramanujam | G07C 5/006 701/23 |
| 2016/0072623 | A1* | 3/2016 | Joye | H04L 9/3073 380/28 |
| 2016/0142418 | A1* | 5/2016 | Barton | H04L 63/10 726/4 |
| 2016/0205114 | A1* | 7/2016 | Yan | H04L 63/12 713/168 |
| 2016/0269174 | A1* | 9/2016 | Yasuda | H04L 9/008 |
| 2016/0321456 | A1* | 11/2016 | Schuman | G06F 17/30312 |
| 2016/0344557 | A1* | 11/2016 | Chabanne | H04L 9/3066 |
| 2017/0019248 | A1* | 1/2017 | Mustafa | H04L 9/008 |
| 2018/0359097 | A1* | 12/2018 | Lindell | H04L 9/3247 |

OTHER PUBLICATIONS

W. Liu, A. S. Uluagac and R. Beyah, "MACA: A privacy-preserving multi-factor cloud authentication system utilizing big data," 2014 IEEE Conference on Computer Communications Workshops (INFOCOM WKSHPS), Toronto, ON, 2014, pp. 518-523. (Year: 2014).*
S. Ruj, M. Stojmenovic and A. Nayak, "Privacy Preserving Access Control with Authentication for Securing Data in Clouds," 2012 12th IEEE/ACM International Symposium on Cluster, Cloud and Grid Computing (ccgrid 2012), Ottawa, ON, 2012, pp. 556-563. (Year: 2012).*
Kiayias, Aggelos, and Qiang Tang. "How to keep a secret: leakage deterring public-key cryptosystenns." Proceedings of the 2013 ACM SIGSAC conference on Computer & communications security. pp. 943-954. ACM, 2013. (Year: 2013).*
Erkin, Zekeriya, et al. "Privacy-preserving content-based recommender system." pp. 77-84. ACM, 2012. (Year: 2012).*
A. Abbas and S. U. Khan, "A Review on the State-of-the-Art Privacy-Preserving Approaches in the e-Health Clouds," in IEEE Journal of Biomedical and Health Informatics, vol. 18, No. 4, pp. 1431-1441, Jul. 2014. (Year: 2014).*
Erkin, et al., "Efficiently Computing Private Recommendations," Information Security and Privacy Lab, Faculty of EEMCS Delft University of Technology, 2628 CD, Delft, The Netherlands. TNO Information and Communication Technology P.O. Box 5050, 2600 GB Delft, The Netherlands. Last Accessed: Sep. 29, 2016, 8 pages.
Sweeney, "k-anonymity: A model for protecting privacy." International Journal of Uncertainty, Fuzziness and Knowledge-Based Systems, 2002, 10(05), pp. 557-570.
Machanavjjhala, et al., "I-diversity: Privacy beyond k-anonymity." TKDD, 2007, 1(1): 12 pages.
Li, et al., "Slicing: A new approach for privacy preserving data publishing." TKDE, 2012, 24(3): pp. 561-574.
Agrawal, et al., "Privacy-preserving data mining." ACM Sigmod Record. ACM, 2000, 29(2): pp. 439-450.
Agrawal, et al., "On the design and quantification of privacy preserving data mining algorithms." PODS. ACM, 2001: pp. 247-255.
Canny, "Collaborative filtering with Privacy." IEEE S&P, 2002. pp. 45-57.
Li, et al., "Pistis: A privacy-preserving content recommender system for online social communities." WI. IEEE, 2011, 1:pp. 79-86.
Li, et al., "YANA: an efficient privacy-preserving recommender system for online social communities." CIKM. ACM, 2011: pp. 2269-2272.
Dwork, "The algorithmic foundations of differential privacy." Foundations and Trends in Theoretical Computer Science, 2014, 9(3-4): pp. 207-346.
Dwork, "The algorithmic foundations of differential privacy." Foundations and Trends in Theoretical Computer Science, 2014, 9(3-4): pp. 347-487.

* cited by examiner

PROVIDING COMPUTATION SERVICES WITH PRIVACY

BACKGROUND

The subject disclosure relates generally to privacy and authorization and in particular to providing a local computation service authorized by a remote service provider while keeping local data private from the remote service provider.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitates providing a local computation service authorized by a remote service provider while keeping local data private from the remote service provider are described.

According to an embodiment, a system is provided. The system includes a memory that stores computer executable components; and a processor that executes the computer executable components stored in the memory. The computer executable components include a security component that can, in response to sending encrypted input data to a service provider that is remote from the system, receives an encrypted signature from the service provider that is generated based on an application of a homomorphic encryption public key and a homomorphic encryption equivalent defined function to the encrypted input data. The security component also decrypts the encrypted signature with a homomorphic encryption private key that is paired with the homomorphic encryption public key to generate a decrypted signature. The computer executable components also includes a service provider application component, local to the system, that applies a defined function corresponding to the homomorphic encryption equivalent defined function on input data to generate a signature. The service provider application component can also, in response to a determination that the signature matches the decrypted signature, grants the system access to a computation service of the service provider application component using the input data.

In another embodiment a computer-implemented method is provided. The computer-implemented method can include transmitting, by a device operatively coupled to a processor, a homomorphic encryption public key and homomorphically encrypted input data to a service provider. The computer-implemented method can also include receiving, by the device from the service provider, a homomorphically encrypted signature generated based on the homomorphic encryption public key, the homomorphically encrypted input data, and a homomorphic encryption equivalent defined function. The computer-implemented method can include, in response to a determination, based on a defined function corresponding to the homomorphic encryption equivalent defined function, that the homomorphically encrypted signature and input data are valid for a computation service, performing, by the device, the computation service on the input data.

In another embodiment, a computer program product for providing a local computation service for a client authorized by a remote service provider while keeping local client data private from the remote service provider. The computer program product can include a computer readable storage medium having program instructions embodied therewith, the program instructions executable by a processing component on a device to cause the processing component to transmit a homomorphic encryption public key and homomorphically encrypted input data to a service provider located remotely from the device. The processing component can also receive, from the service provider, a homomorphically encrypted signature generated based on the homomorphic encryption public key, the homomorphically encrypted input data, and a homomorphic encryption equivalent defined function. The processing component can also, in response to a determination, based on a defined function corresponding to the homomorphic encryption equivalent defined function, that the homomorphically encrypted signature and input data are valid for a computation service, perform the computation service on the input data.

DETAILED DESCRIPTION

Figure 1:
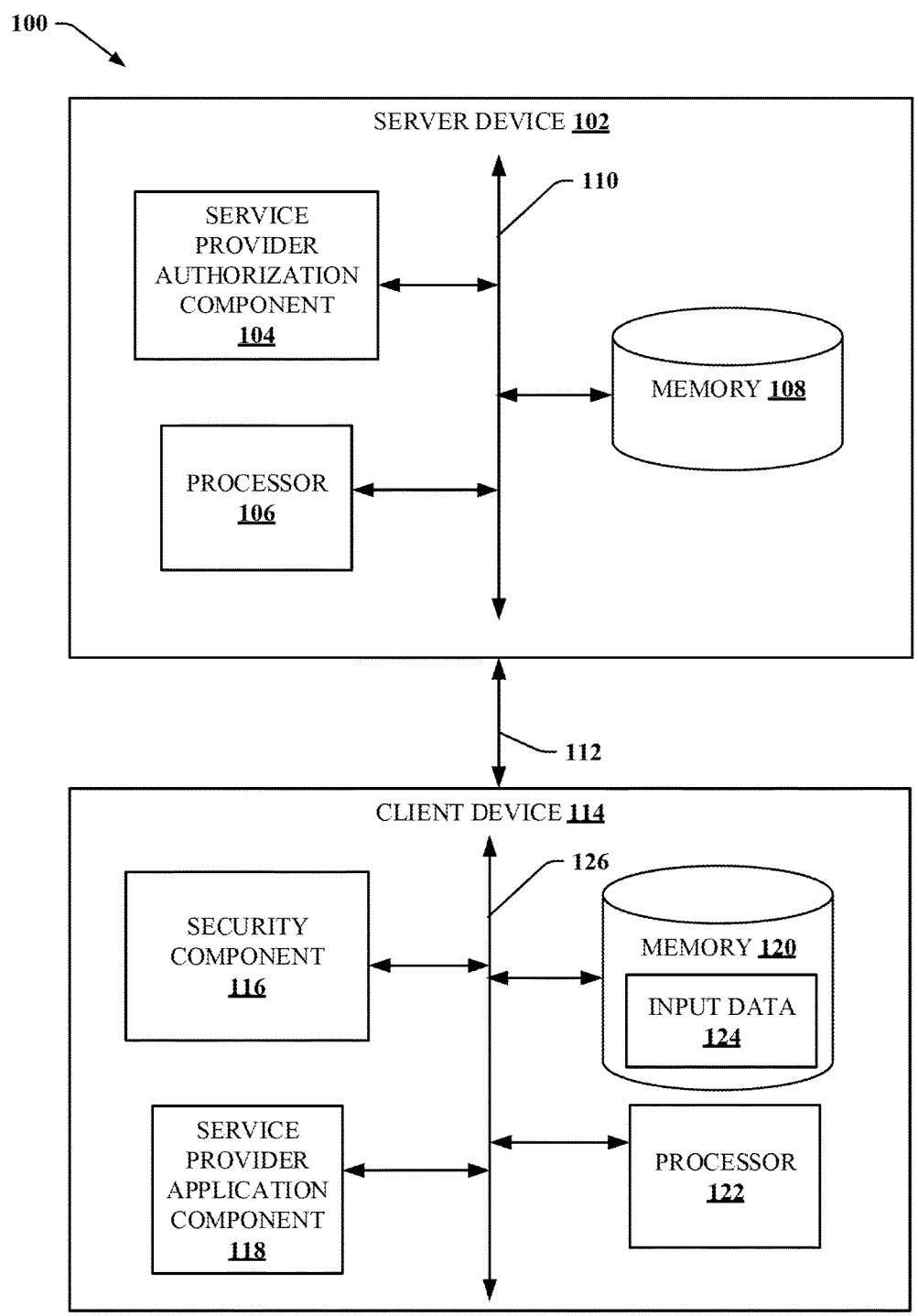
FIG. 1 illustrates a block diagram of an example, non-limiting architecture that facilitates providing a local computation service authorized by a remote service provider while keeping local data private from the remote service provider in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however in various cases, that the one or more embodiments can be practiced without these specific details.

With increases in network speeds and bandwidth, service providers are making many computation services available to clients over networks, such as the Internet. The service provider can make a computation service available on their server device (e.g. server device, server system, and/or cloud computing system) that the client's device can access across the internet by sending input data and receiving output data generated by the computation service. A computation service can include, but is not limited to, a recommendation service, a data analytics service, a data mining service, a financial analysis service, a marketing analysis service, a pricing analysis service, a forecasting analysis service, a parameter tuning service, a testing analysis service, or any other suitable computing service that can be provided as a remote service over a network. For example, a company can employ a remote computation service that analyzes sales data and provides recommendations on target demographics for marketing and/or sales forecasts. In another example, a manufacturing business can employ a remote computation service that analyzes production data and provides process improvement recommendations and/or production forecasts. In a further example, a business can employ a remote computation service that analyzes cost and pricing data and provides recommendations on product pricing. In a non-limiting example, the client can pay a defined fee for the computation service for a defined set of input data.

However, a client that wants to employ a remote computation service can be hesitant to transmit input data (e.g., customer data, sales data, financial data, marketing data, pricing data, inventory data, or any other suitable input data employable by a computation service) that is private over a public network and/or to a third party, and thus may not employ the remote computation service. For example, a client that wants to employ the remote computation service might not want a service provider that is providing the remote computation service to have visibility to the input data. In another example, the client might be fearful of transmitting the input data to the remote computation service over a public or private network due to concerns over a third party intercepting the input data during transmission or upon arrival at a device associated with the remote computation service. To overcome this hesitation, a service provider can provide a service provider application that can run on a client's device and perform the computation service locally for the client. Still, the service provider can want to control usage of the computation service locally for the defined set of input data for which the client has paid fees even without having visibility to the defined set of input data. For example, the service provide can want to limit usage of the computation service only to the defined set of input data and/or for other limitations associated with the defined set of input data, such as in a non-limiting example, time limit, number of computations, or any other suitable limitation on usage of the computation service.

To address the challenges in providing a local computation service authorized by a remote service provider while keeping local data private from the remote service provider as described herein, one or more embodiments described herein can employ an encryption scheme that encrypts input data for which the client wants to employ a computation service provided locally by a service provider, a signature scheme that the service provider can employ on a server device to generate a signature based on the encrypted input data, and a verification scheme that service provider application can employ locally on a client device to verify that the input data is authorized to for employment by the service provider application for the computation service.

One or more embodiments of the subject disclosure is directed to computer processing systems, computer-implemented methods, apparatus and/or computer program products that facilitate efficiently, effectively, and automatically (e.g., without direct human involvement) providing a local computation service authorized by a remote service provider while keeping local data private from the remote service provider. The computer processing systems, computer-implemented methods, apparatus and/or computer program products can employ hardware and/or software to solve problems that are highly technical in nature (e.g., automated enablement of a local computation service authorized by a remote service provider while keeping local data private from the remote service provider, generation and/or employment of one or more different detailed, specific and highly-complex authorization models) that are not abstract and that cannot be performed as a set of mental acts by a human. For example, a human, or even thousands of humans, cannot efficiently, accurately and effectively manually gather and analyze thousands of data elements related to employing one or more different encryption schemes that encrypts input data for which the client wants to employ a computation service provided locally by a service provider, a signature scheme that the service provider can employ on a server device to generate a signature based on the encrypted input data, and a verification scheme that service provider application can employ locally on a client device to verify that the input data is authorized to for employment by the service provider application for the computation service. One or more embodiments of the subject computer processing systems, methods, apparatuses and/or computer program products can facilitate the automated enablement of a local computation service authorized by a remote service provider while keeping local data private from the remote service provider in a highly accurate and efficient manner. By employing automated enablement of a local computation service authorized by a remote service provider while keeping local data private from the remote service provider, the, privacy, security, processing time, and/or accuracy associated with the existing automated authorization is substantially improved. Additionally, the nature of the problem solved is inherently related to technological advancements in Internet-based media and/or transactions that have not been previously addressed in this manner. Further, one or more embodiments of the subject techniques can facilitate improved performance of automated enablement of a local computation service authorized by a remote service provider while keeping local data private from the remote service provider for more efficient usage of storage resources, processing resources, and network bandwidth resources to provide privacy of defined client data for remotely authorized computation services on the defined client data, while restricting usage of the computation service to only the defined client data and associated limitations (e.g., amount of time, number of computations, and/or any other suitable limitations).

FIG. 1 illustrates a block diagram of an example, non-limiting architecture 100 that facilitates providing a local computation service authorized by a remote service provider while keeping local data private from the remote service provider in accordance with one or more embodiments described herein. Aspects of architectures (e.g., architecture 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

As shown in FIG. 1, the architecture 100 can include a server device 102, one or more networks 112 and one or more client devices 114. Server device 102 can include service provider authorization component 104 that can facilitate authorizing a computation service on client device 114 for a defined set of input data 124. Server device 102 can also include or otherwise be associated with at least one included memory 108 that can store computer executable components (e.g., computer executable components can include, but are not limited to, service provider authorization component 104 and associated components), and can store any data generated by service provider authorization component 104 and associated components. Server device 102 can also include or otherwise be associated with at least one processor 106 that executes the computer executable components stored in memory 108. Server device 102 can further include a system bus 110 that can couple the various components including, but not limited to, service provider authorization component 104, memory 108 and/or processor 106.

Client device 114 can include security component 116 that can facilitate protecting privacy of the defined set of input data 124 from server device 102. Client device 114 can also include service provider application component 118 that can facilitate verifying authorization of the computation service on client device 114 for the defined set of input data, and performing the computation service on client device 114 for the defined set of input data. Client device 114 can also include or otherwise be associated with at least one included memory 120 that can store input data 124, computer executable components (e.g., computer executable components can include, but are not limited to, security component 116, service provider application component 118, and associated components), and can store any data generated by security component 116, service provider application component 118, and associated components. Client device 114 can also include or otherwise be associated with at least one processor 122 that executes the computer executable components stored in memory 120. Client device 114 can further include a system bus 126 that can couple the various components including, but not limited to, security component 116, service provider application component 118, memory 120 and/or processor 122.

It is to be appreciated that server device 102 can be associated with a service provider that provided service provider application component 118 to client device 114, and client device 114 can be associated with a client that wants to employ service provider application component 118 to perform one or more computation services on a defined set of input data 124 according to one or more limitations for which the client has paid the service provider while maintaining the defined set of input data private from the service provider.

Server device 102 and/or client device 114 can be any computing device or computing system that can be communicatively coupled together, non-limiting examples of which can include, but are not limited to, a computing system, a server computer, a computer, a mobile computer, a tablet computer, a mobile phone, a mainframe computer, a network storage device, a communication device, a web server device, a network switching device, a network routing device, a gateway device, a network hub device, a network bridge device, a control system, or any other suitable computing device. It is to be appreciated that server device 102, and/or client device 114 can be equipped with communication components (not shown) that enable communication between server device 102 and/or client device 114 over one or more networks 112.

The various components (e.g., service provider authorization component 104, memory 108, processor 106, server device 102, client devices 114, security component 116, service provider application component 118, memory 120 and/or processor 122, and/or other components) of architecture 100 can be connected either directly or via one or more networks 112. Such networks 112 can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology.

Security component 116 can employ a homomorphic encryption scheme to generate a homomorphic encryption public key 202 and a homomorphic encryption private key. Homomorphic encryption is a form of encryption that allows computations to be carried out on ciphertext, thus generating an encrypted result which, when decrypted, matches the result of operations performed on the plaintext. It is to be appreciated that, in some embodiments, the homomorphic encryption scheme can be non-symmetric so that the homomorphic encryption private key cannot be derived from the homomorphic encryption public key. Examples of non-symmetric homomorphic encryption schemes can include, but are not limited to, Paillier cryptosystem, Damgård-Jurik cryptosystem, Naccache-Stern cryptosystem, Okamoto-Uchiyama cryptosystem, ElGamal encryption scheme, Boneh-Goh-Nissim Encryption Scheme, Goldwasser-Micali encryption scheme, or any other suitable homomorphic encryption scheme.

Figure 2A:
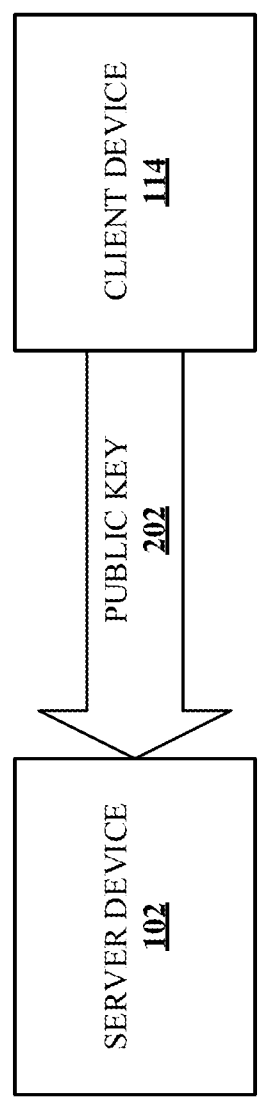
FIG. 2A illustrates a block diagram of an example, non-limiting transmission of a homomorphic encryption public key from a client device to a server device in accordance with one or more embodiments described herein.

FIG. 2A illustrates a block diagram of an example, non-limiting transmission of the homomorphic encryption public key 202 from client device 114 to server device 102 in accordance with one or more embodiments described herein. For example, security component 116 or another component of client device 114 can transmit the homomorphic encryption public key 202 to server device 102 over network 112. Repetitive description of like elements employed in other embodiments described herein is omitted for sake of brevity.

Referring back to FIG. 1, security component 116 can obtain a defined set of input data (e.g., input data 124) on which a client associated with client device 114 would like a computation service to be performed by service provider application component 118. Security component 116 can prepare the input data 124 for encryption by scaling (e.g., rounding, truncating, or any other suitable scaling mechanism) any (or, in some embodiments, one or more) values in the input data 124 that are not whole integers into whole integers to generate a set of prepared input data. Security component 116 can encrypt the prepared input data using the homomorphic encryption public key to generate a set of encrypted input data (e.g., encrypted input data 204).

In an alternative example, service provider application component 118 can prepare the input data 124 for encryption by scaling any (or, in some embodiments, one or more) values in the input data 124 that are not whole integers into whole integers to generate a set of prepared input data. This can save processing resources later in cases in which the service provider application component 118 verifies input data 124 and a decrypted form of encrypted signature 206. In some embodiments, a service provider application component 118 will not provide input data 124 to server device 102 or any other components that are not authorized to have access to the input data 124. It is to be appreciated that security component 116 can monitor and/or prevent service provider application component 118 from transmitting input data 124 outside of service provider application component 118. For example, security component 116 can block transmissions by service provider application component 118. In another example, security component 116 can block intercept transmissions by service provider application component 118 and only allow transmissions that do not include any portion of input data 124.

Figure 2B:
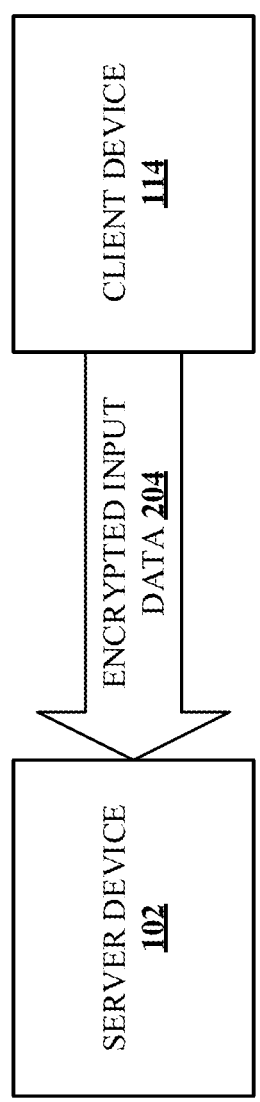
FIG. 2B illustrates a block diagram of an example, non-limiting transmission of a homomorphically encrypted input data from a client device to a server device in accordance with one or more embodiments described herein.

FIG. 2A illustrates a block diagram of an example, non-limiting transmission of the encrypted input data 204 from client device 114 to server device 102 in accordance with one or more embodiments described herein. For example, security component 116 or another component of client device 114 can transmit the encrypted input data 204 to server device 102 over network 112. It is to be appreciated that while FIGS. 2A and 2B depict separate transmissions of the homomorphic encryption public key 202 and encrypted input data 204 from client device 114 to server device 102, in another example, the homomorphic encryption public key 202 and encrypted input data 204 can be transmitted together from client device 114 to server device 102.

Referring back to FIG. 1, server device 102 can receive the homomorphic encryption public key 202 and encrypted input data 204 from client device 114. It is to be appreciated that server device 102 does not have homomorphic encryption private key, and therefore cannot decrypt encrypted input data 204. Service provider authorization component 104 can have a defined function $f$ that can generate a signature on input data and a defined function $f_{HE}$ that can generate an encrypted signature from encrypted input data using a homomorphic encryption scheme. In some embodiments, the defined function $f$ is limited to the mathematical operations of addition and/or multiplication. In Homomorphic Encryption (HE), additions and/or multiplications of integers in encrypted form can be computed. For a non-limiting example, given two integers x1 and x2, and E( ) as a homomorphic encryption operation and given an example function z=x1+x2, then E(z)=E(x1+x2)=E(x1)*E(x2). This means that an addition operation in unencrypted form can be converted to a multiplication operation in encrypted form. Similarly, a multiplication operation in unencrypted form should be converted to an exponentiation operation in encrypted form. For example, E(2*y) is equal to E(y)$^2$. Therefore, with D( ) as a homomorphic decryption operation corresponding to homomorphic encryption operation E( ), then $f$=D($f_{HE}$) or equivalently E($f$)=$f_{HE}$. For example, given a set of input data (a1, . . . , a$_m$), where m is a positive integer representing the number of data elements in the set of input data, and also given a set of homomorphic ally encrpypted input data (b1, . . . , b$_m$) encrpyted from input data (a1, . . . , a$_m$) then $f$(a1, . . . , a$_m$)=D($f_{HE}$(b1, . . . , b$_m$)) or equivalently E($f$(a1, . . . , a$_m$))=$f_{HE}$(b1, . . . , b$_m$). It is to be appreciated that service provider authorization component 104 can generate defined function $f_{HE}$ from defined function $f$ and/or generate defined function $f$ from defined function $f_{HE}$.

It is also to be appreciated that service provider authorization component 104 can provide one or more user interfaces (not shown) that allow a user and/or an operator of service provider authorization component 104 to specify defined function $f$ and/or a defined function $f_{HE}$.

Service provider authorization component 104 can employ a homomorphic encryption public key 202 to encrypt numerical parameters in defined function $f_{HE}$. Therefore, defined function $f_{HE}$ for encrypted input data 204 can be the homomorphic encryption equivalent of defined function $f$ for the prepared input data used to generate encrypted input data 204 with homomorphic encryption public key 202. In a non-limiting example, for a defined function $f_{HE}$=3*x1, service provider authorization component 104 can employ the homomorphic encryption public key 202 to encrypt the number 3 in $f_{HE}$ so that $f_{HE}$=E(3)*x1. Service provider authorization component 104 can then employ defined function $f_{HE}$ with the encrypted numerical parameters on encrypted input data 204 to generate an encrypted signature 206.

It is to be appreciated that, in some embodiments, the defined function $f$ is also known to service provider application component 118, but defined function $f$ and defined function $f_{HE}$ are not known to other components of client device 114. This can prevent client device 114 from generating a valid decrypted signature for use with service provider application component 118.

Figure 2C:
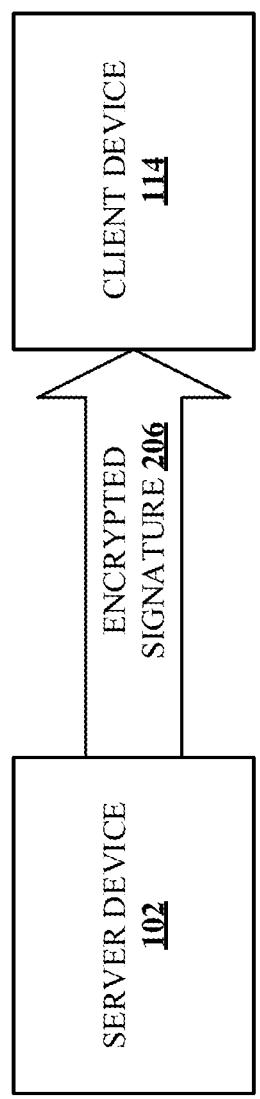
FIG. 2C illustrates a block diagram of an example, non-limiting transmission of a homomorphically encrypted signature from a server device to a client device in accordance with one or more embodiments described herein.

FIG. 2C illustrates a block diagram of an example, non-limiting transmission of the encrypted signature 206 from server device 102 to client device 114 in accordance with one or more embodiments described herein. For example, service provider authorization component 104 or another component of server device 102 can transmit the encrypted signature 206 from server device 102 to client device 114 over network 112. Repetitive description of like elements employed in other embodiments described herein is omitted for sake of brevity.

Referring back to FIG. 1, client device 114 can receive encrypted signature 206 from server device 102. Security component 116 can employ the homomorphic encryption private key to decrypt encrypted signature 206 to generate a decrypted signature. It is to be appreciated that in some embodiments service provider application component 118 does not have access to the homomorphic encryption private key to prevent the homomorphic encryption private key from becoming available to server device 102 or any other unauthorized components from service provider application component 118. Security component 116 can provide input data 124 and the decrypted signature to service provider application component 118. It is to be appreciated that security component 116 can monitor and/or prevent service provider application component 118 from transmitting input data 124 outside of service provider application component 118. Furthermore, in some embodiments, service provider application component 118 does not have access to the homomorphic encryption private key to prevent the homomorphic encryption private key from becoming available to server device 102 or any other unauthorized components from service provider application component 118.

Service provider application component 118 can prepare the input data 124 by scaling any (or, in some embodiments, one or more) values in the input data 124 that are not whole integers into whole integers to generate the prepared input data, and employ defined function $f$ to generate a signature on the prepared input data. Service provider application component 118 can compare the signature to the decrypted signature to verify whether the to perform the computation service on input data 124. If service provider application component 118 determines that the signature matches the decrypted signature, then service provider application component 118 can perform the computation service on input data 124 according to any associated limitations on performance of the computation service with input data 124, and generate any results (e.g., analysis output, recommendation, report, data value, or any other suitable result) of the computation service on input data 124. If service provider application component 118 determines that the signature does not match the decrypted signature, then service provider application component 118 can reject performing the computation service on input data 124.

In an alternative embodiment, prepared input data can comprise a subset of input data 124. For example, a large set of input data 124 can require considerable usage of storage, processing, and/or network bandwidth resources. To reduce usage of storage, processing, and/or network bandwidth resources, a subset of input data 124 can be employed as the prepared input data that is used for verification of authorization by security component 116, service provider authorization component 104, and/or service provider application component 118 for the computation service on the set of input data 124. For example, service provider application component 118 can employ a predefined sampling algorithm, a random sampling, or any other suitable mechanism for determining a subset of input data 124 to be employed for prepared input data.

While FIG. 1 depicts separate components in server device 102 and/or client device 114, it is to be appreciated that two or more components can be implemented in a common component. Further, it is to be appreciated that the design of the server device 102 and/or client device 114 can include other component selections, component placements, etc., to facilitate automatically providing a local computation service authorized by a remote service provider while keeping local data private from the remote service provider in accordance with one or more embodiments described herein. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed can be performed by specialized computers for carrying out defined tasks related to automatically providing a local computation service authorized by a remote service provider while keeping local data private from the remote service provider. The subject computer processing systems, methods apparatuses and/or computer program products can be employed to solve new problems that arise through advancements in technology, computer networks, the Internet and the like. The subject computer processing systems, methods apparatuses and/or computer program products can provide technical improvements to systems automatically providing a local computation service authorized by a remote service provider while keeping local data private from the remote service provider in a live environment by improving processing efficiency among processing components in these systems, reducing delay in processing performed by the processing components, reducing storage requirements, reducing network bandwidth usage, and/or improving the accuracy in which the processing systems automatically determine provide a local computation service authorized by a remote service provider while keeping local data private from the remote service provider.

The embodiments of devices described herein can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, z=(z1, z2, z3, z4, zn), to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 3:
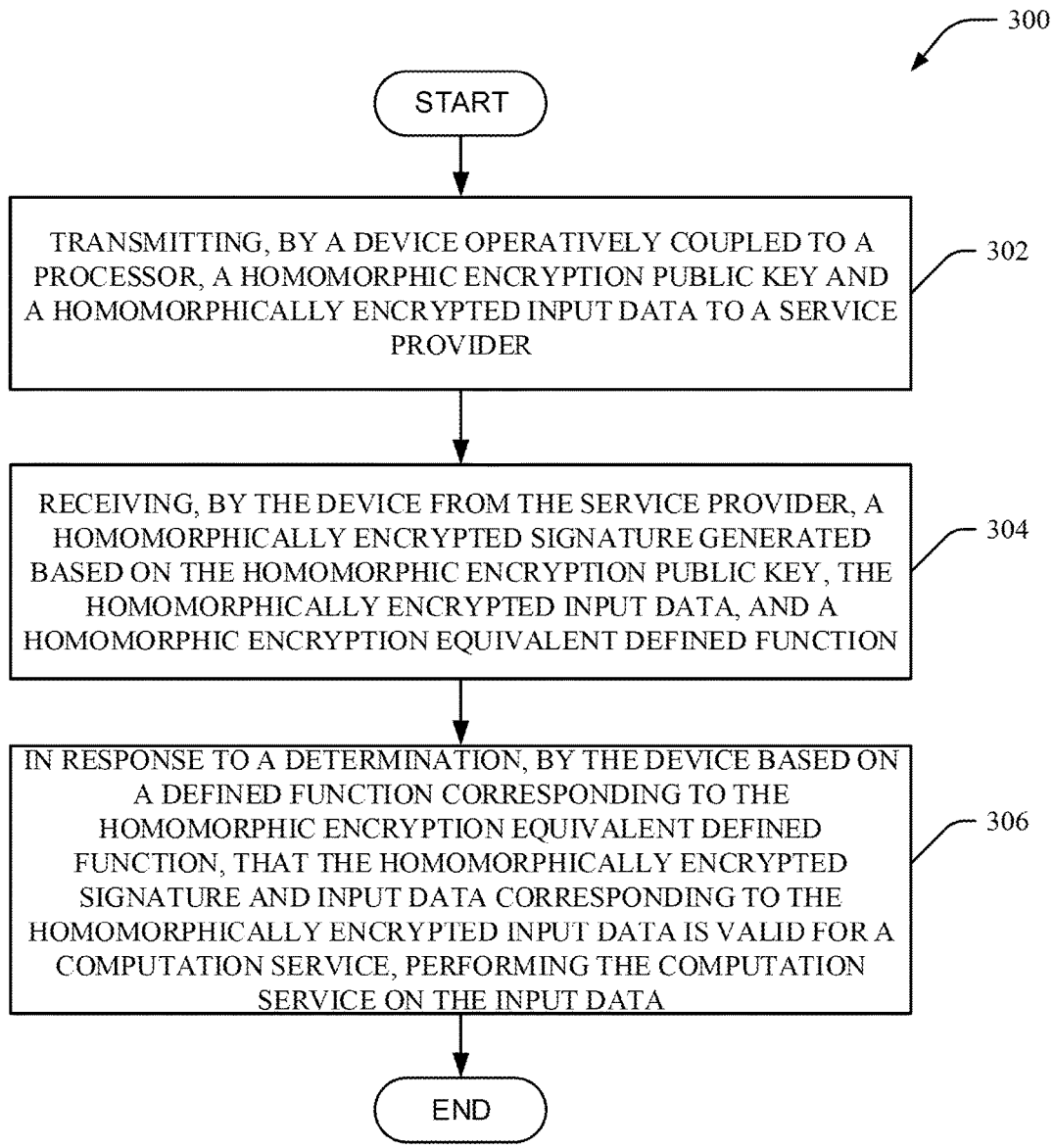
FIG. 3 illustrates a flow diagram of an example, non-limiting computer-implemented method that facilitates a client device to obtain authorization from a remote service provider for a computation service on the client device set of input data while keeping the set of input data private from the remote service provider in accordance with one or more embodiments described herein.

FIG. 3 illustrates a flow diagram of an example, non-limiting computer-implemented method 300 that facilitates a client device to obtain authorization from a remote service provider for a computation service on the client device set of input data, while keeping the set of input data private from the remote service provider in accordance with one or more embodiments described herein. Repetitive description of like elements employed in other embodiments described herein is omitted for sake of brevity.

At 302, method 300 can include transmitting, by a device operatively coupled to a processor, a homomorphic encryption public key and a homomorphically encrypted input data to a service provider (e.g., via a security component 116, and/or a client device 114). At 304, method 300 can include receiving, by the device from the service provider, a homomorphically encrypted signature generated based on the homomorphic encryption public key, the homomorphically encrypted input data, and a homomorphic encryption equivalent defined function (e.g., via a security component 116, service provider application component 118, and/or a client device 114). At 306, method 300 can include, in response to a determination, by the device based on a defined function corresponding to the homomorphic encryption equivalent defined function, that the homomorphically encrypted signature and input data corresponding to the homomorphically encrypted input data is valid for a computation service, performing the computation service on the input data (e.g., via a security component 116, service provider application component 118, and/or a client device 114).

Figure 4:
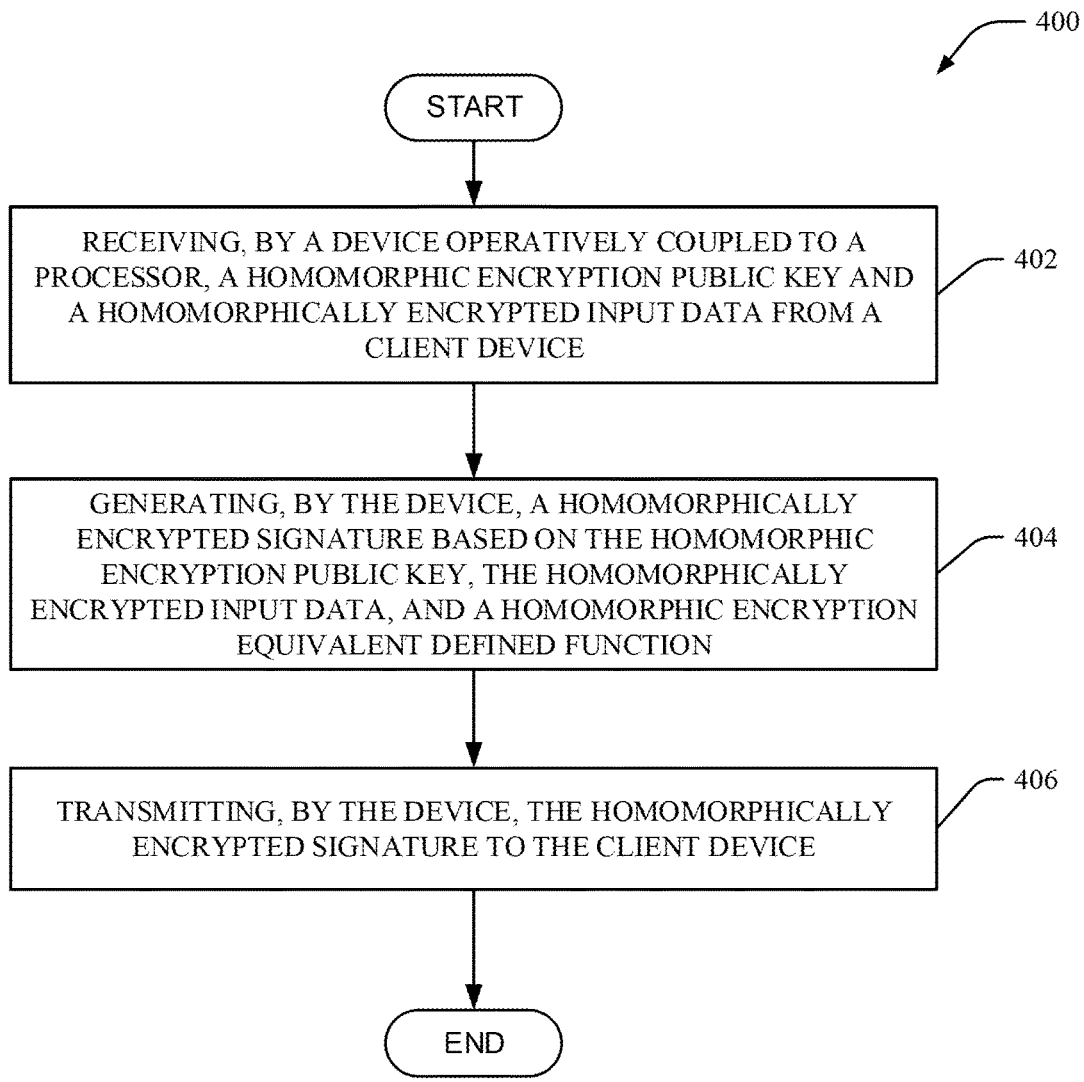
FIG. 4 illustrates a flow diagram of an example, non-limiting computer-implemented method that facilitates a service provider to remotely authorize a computation service on a client device for a set of input data while keeping the set of input data private from the service provider in accordance with one or more embodiments described herein.

FIG. 4 illustrates a flow diagram of an example, non-limiting computer-implemented method 400 that facilitates a service provider to remotely authorize a computation service on a client device for a set of input data, while keeping the set of input data private from the service provider in accordance with one or more embodiments described herein. Repetitive description of like elements employed in other embodiments described herein is omitted for sake of brevity.

At 402, method 400 can include receiving, by a device operatively coupled to a processor, a homomorphic encryption public key and a homomorphically encrypted input data from a client device (e.g., via a service provider authorization component 104 and/or a server device 102). At 404, method 400 can include generating, by the device, a homomorphically encrypted signature based on the homomorphic encryption public key, the homomorphically encrypted input data, and a homomorphic encryption equivalent defined function (e.g., via a service provider authorization component 104 and/or a server device 102). At 406, method 400 can include transmitting, by the device, the homomorphically encrypted signature to the client device (e.g., via a service provider authorization component 104 and/or a server device 102).

Figure 5:
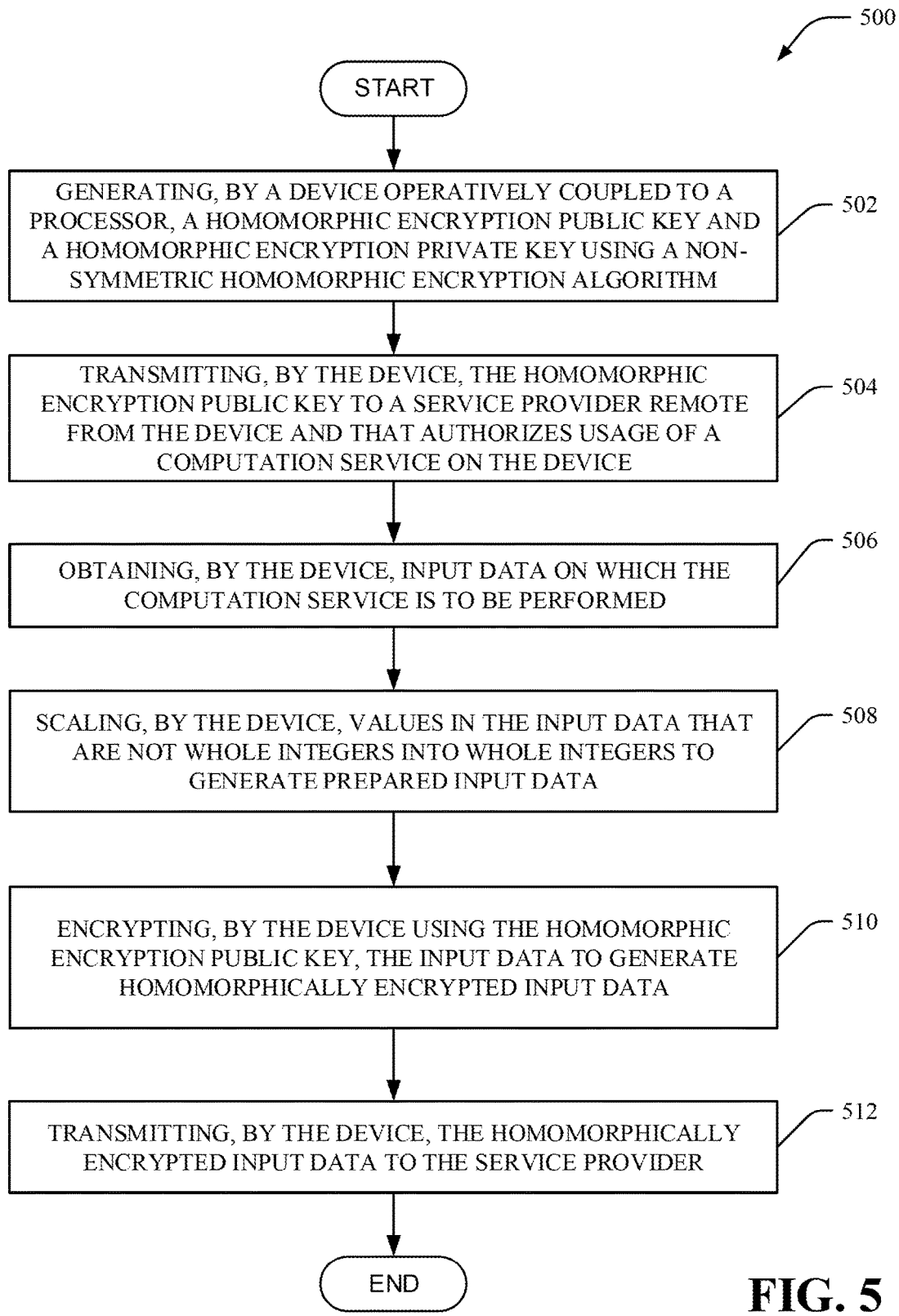
FIG. 5 illustrates a flow diagram of an example, non-limiting computer-implemented method that facilitates a client device generating and transmitting to a service provider a homomorphic encryption public key and homomorphically encrypted input data t in accordance with one or more embodiments described herein.

FIG. 5 illustrates a flow diagram of an example, non-limiting computer-implemented method 500 that facilitates a client device generating and transmitting to a service provider a homomorphic encryption public key and homomorphically encrypted input data in accordance with one or more embodiments described herein. Repetitive description of like elements employed in other embodiments described herein is omitted for sake of brevity.

At 502, method 500 can include generating, by a device operatively coupled to a processor, a homomorphic encryption public key and a homomorphic encryption private key using a non-symmetric homomorphic encryption algorithm (e.g., via a security component 116, and/or a client device 114). At 504, method 500 can include transmitting, by the device, the homomorphic encryption public key to a service provider remote from the device and that authorizes usage of a computation service on the device (e.g., via a security component 116, and/or a client device 114). At 506, method 500 can include obtaining, by the device, input data on which the computation service is to be performed (e.g., via a security component 116, and/or a client device 114). At 508, method 500 can include scaling, by the device, values in the input data that are not whole integers into whole integers to generate prepared input data (e.g., via a security component 116, and/or a client device 114). At 510, method 500 can include encrypting, by the device using the homomorphic encryption public key, the input data to generate homomorphically encrypted input data (e.g., via a security component 116, and/or a client device 114). At 512, method 500 can include transmitting, by the device, the homomorphically encrypted input data to the service provider (e.g., via a security component 116, and/or a client device 114).

Figure 6:
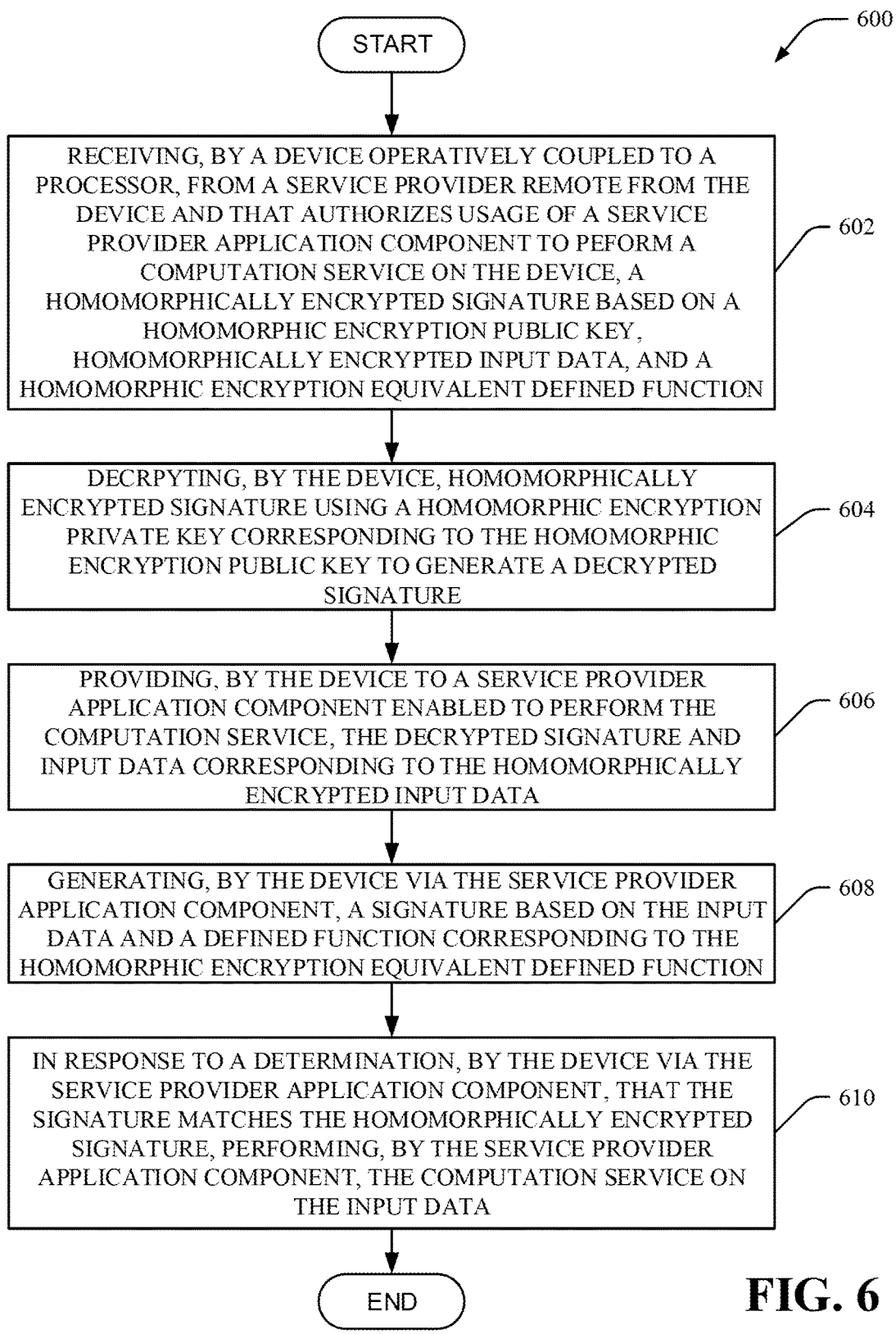
FIG. 6 illustrates a flow diagram of an example, non-limiting computer-implemented method that facilitates a client device determining whether a computation service on the client device is authorized by a remote service provider for a set of input data in accordance with one or more embodiments described herein.

FIG. 6 illustrates a flow diagram of an example, non-limiting computer-implemented method 600 that a client device determining whether a computation service on the client device is authorized by a remote service provider for a set of input data in accordance with one or more embodiments described herein. Repetitive description of like elements employed in other embodiments described herein is omitted for sake of brevity.

At 602, method 600 can include receiving, by a device operatively coupled to a processor, from a service provider remote from the device and that authorizes usage of a service provider application component to peform a computation service on the device, a homomorphically encrypted signature based on a homomorphic encryption public key, homomorphically encrypted input data, and a homomorphic encryption equivalent defined function (e.g., via a security component 116, service provider application component 118, and/or a client device 114). At 604, method 600 can include decrpyting, by the device, homomorphically encrypted signature using a homomorphic encryption private key corresponding to the homomorphic encryption public key to generate a decrypted signature (e.g., via a security component 116 and/or a client device 114). At 606, method 600 can include providing, by the device to a service provider application component enabled to perform the computation service, the decrypted signature and input data corresponding to the homomorphically encrypted input data (e.g., via a security component 116 and/or a client device 114). At 608, method 600 can include generating, by the device via the service provider application component, a signature based on the input data and a defined function corresponding to the homomorphic encryption equivalent defined function (e.g., via a service provider application component 118 and/or a client device 114). At 610, method 600 can include, in response to a determination, by the device via the service provider application component, that the signature matches the homomorphically encrypted signature, performing, by the service provider application component, the computation service on the input data (e.g., via a service provider application component 118 and/or a client device 114).

Figure 7:
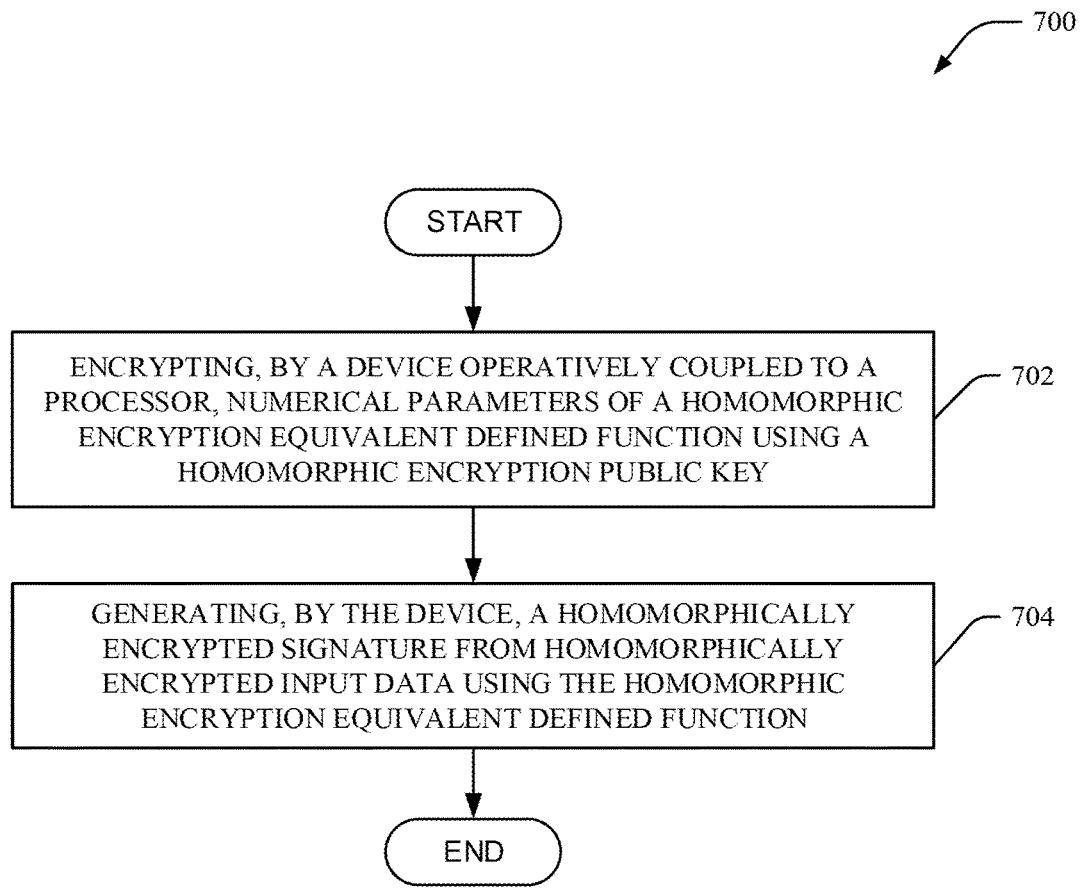
FIG. 7 illustrates a flow diagram of an example, non-limiting computer-implemented method that facilitates a service provider generating a homomorphically encrypted signature from homomorphically encrypted input data in accordance with one or more embodiments described herein.

FIG. 7 illustrates a flow diagram of an example, non-limiting computer-implemented method 700 that facilitates a service provider generating a homomorphically encrypted signature from homomorphically encrypted input data in accordance with one or more embodiments described herein. Repetitive description of like elements employed in other embodiments described herein is omitted for sake of brevity.

At 702, method 700 can include encrypting, by a device operatively coupled to a processor, numerical parameters of a homomorphic encryption equivalent defined function using a homomorphic encryption public key (e.g., via a service provider authorization component 104 and/or a server device 102). At 704, method 700 can include generating, by the device, a homomorphically encrypted signature from homomorphically encrypted input data using the homomorphic encryption equivalent defined function (e.g., via a service provider authorization component 104 and/or a server device 102).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
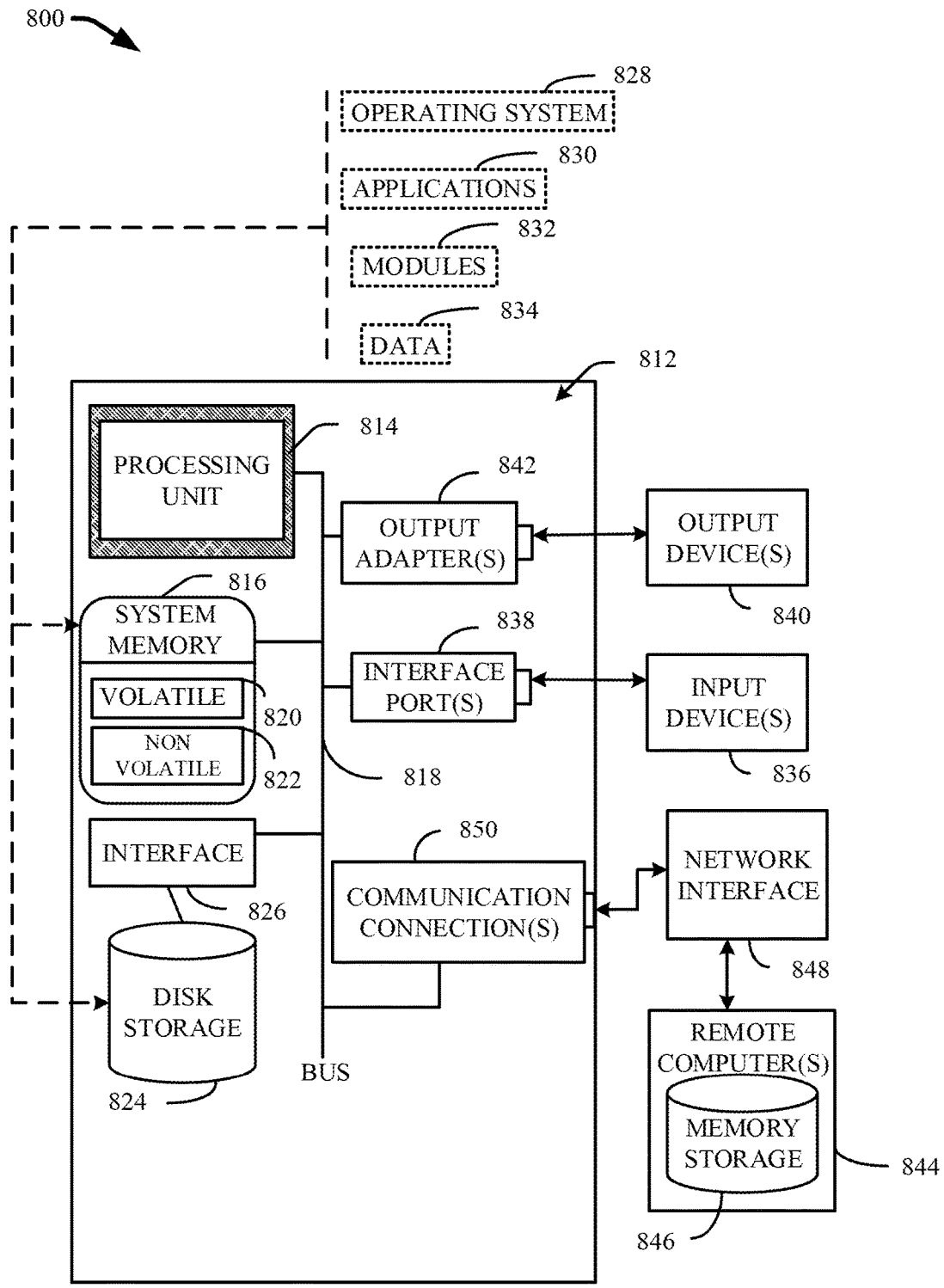
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 894), and Small Computer Systems Interface (SCSI). The system memory 816 can also include volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 820 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 812 can also include removable/non-removable, volatile/nonvolatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 824 to the system bus 818, a removable or non-removable interface is typically used, such as interface 826. FIG. 8 also depicts software that acts as an intermediary between users and the basic computer resources described in the suitable operating environment 801. Such software can also include, for example, an operating system 828. Operating system 828, which can be stored on disk storage 824, acts to control and allocate resources of the computer 812. System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

In an embodiment, for example, computer 812 can perform operations comprising: transmitting a homomorphic encryption public key and homomorphically encrypted input data to a service provider; receiving, from the service provider, a homomorphically encrypted signature generated based on the homomorphic encryption public key, the homomorphically encrypted input data, and a homomorphic encryption equivalent defined function; and in response to a determination, based on a defined function corresponding to the homomorphic encryption equivalent defined function, that the homomorphically encrypted signature and input data are valid for a computation service, performing the computation service on the input data.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
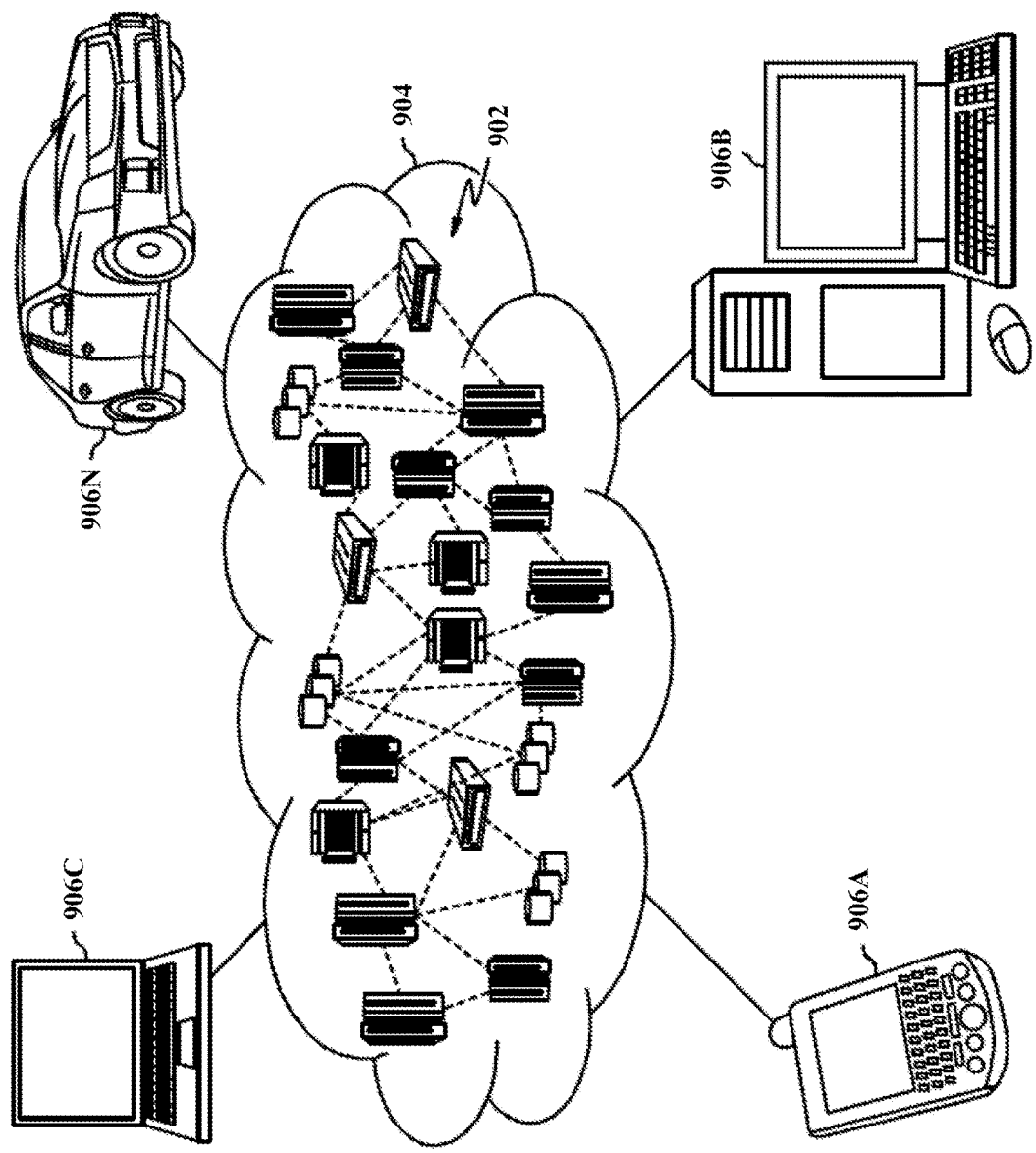
FIG. 9 illustrates a block diagram of an example, non-limiting cloud computing environment in accordance with one or more embodiments described herein.
Figure 10:
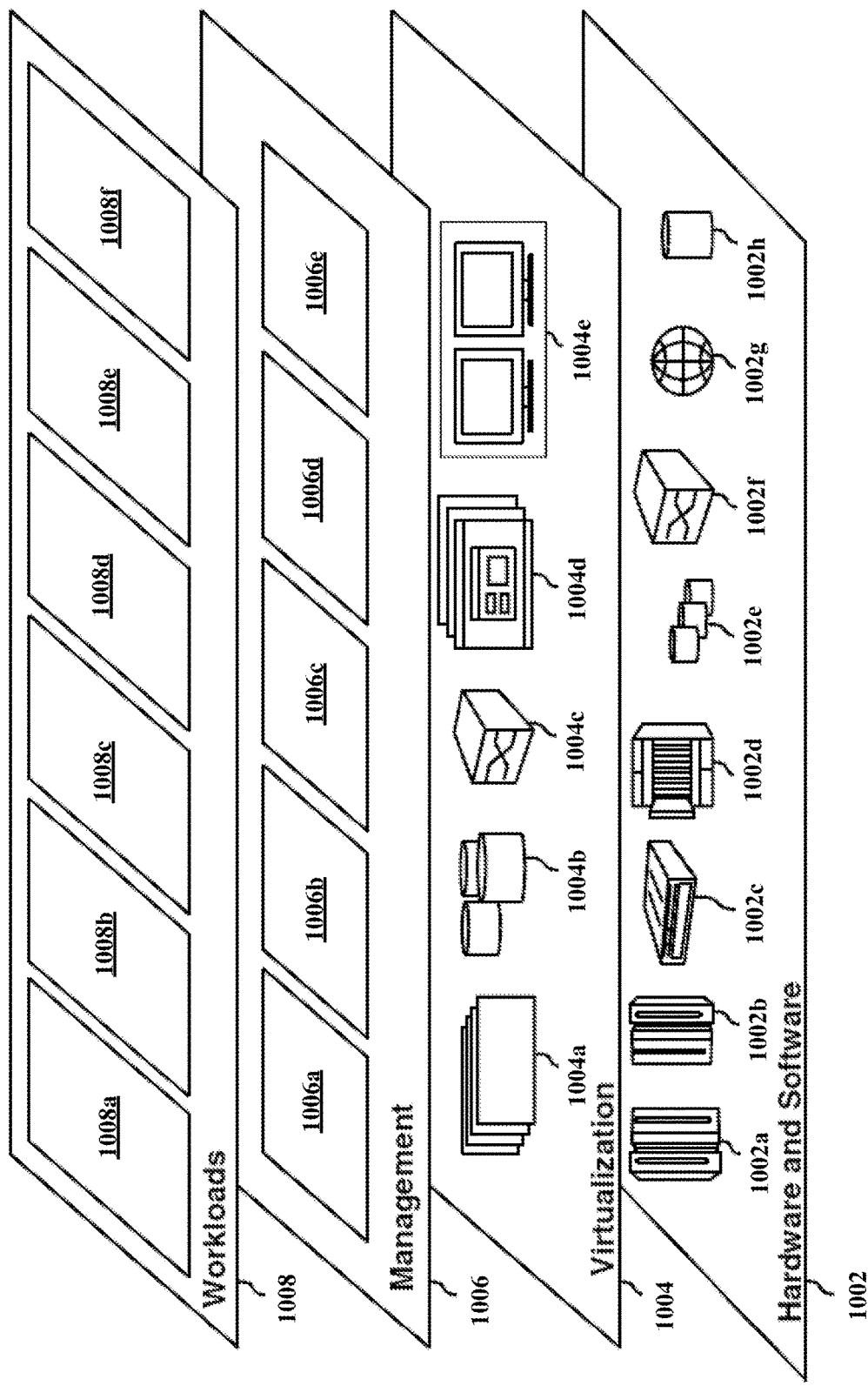
FIG. 10 illustrates a block diagram of example, non-limiting abstraction model layers in accordance with one or more embodiments described herein.

Referring now to FIG. 9, an illustrative cloud computing environment 904 is depicted. As shown, cloud computing environment 904 includes one or more cloud computing nodes 902 with which local computing devices used by cloud consumers, such as, for example, personal digital assistant (PDA) or cellular telephone 906A, desktop computer 906B, laptop computer 906C, and/or automobile computer system 906N may communicate. Nodes 902 may communicate with one another. They may be grouped (not shown) physically or virtually, in one or more networks, such as Private, Community, Public, or Hybrid clouds as described hereinabove, or a combination thereof. This allows cloud computing environment 904 to offer infrastructure, platforms and/or software as services for which a cloud consumer does not need to maintain resources on a local computing device. It is understood that the types of computing devices 906A-N shown in FIG. 9 are intended to be illustrative only and that computing nodes 902 and cloud computing environment 904 can communicate with any type of computerized device over any type of network and/or network addressable connection (e.g., using a web browser).

Referring now to FIG. 2, a set of functional abstraction layers provided by cloud computing environment 904 (FIG. 9) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 1002 includes hardware and software components. Examples of hardware components include: mainframes 1002a; RISC (Reduced Instruction Set Computer) architecture based servers 1002b; servers 1002c; blade servers 1002d; storage devices 1002e; and networks and networking components 1002f. In some embodiments, software components include network application server software 1002g and database software 1002h.

Virtualization layer 1004 provides an abstraction layer from which the following examples of virtual entities may be provided: virtual servers 1004a; virtual storage 1004b; virtual networks 1004c, including virtual private networks; virtual applications and operating systems 1004d; and virtual clients 1004e.

In one example, management layer 1006 may provide the functions described below. Resource provisioning 1006a provides dynamic procurement of computing resources and other resources that are utilized to perform tasks within the cloud computing environment. Metering and Pricing 1006b provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1006c provides access to the cloud computing environment for consumers and system administrators. Service level management 1006d provides cloud computing resource allocation and management such that required service levels are met. Service Level Agreement (SLA) planning and fulfillment 1006e provide pre-arrangement for, and procurement of, cloud computing resources for which a future requirement is anticipated in accordance with an SLA.

Workloads layer 1008 provides examples of functionality for which the cloud computing environment may be utilized. Non-limiting examples of workloads and functions which may be provided from this layer include: mapping and navigation 1008a; software development and lifecycle management 1008b; virtual classroom education delivery 1008c; data analytics processing 1008d; transaction processing 1008e; and mobile desktop 1008f.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A system, comprising:
  a memory that stores computer executable components;
  a processor, coupled to the memory, and that executes computer executable components stored in the memory, wherein the computer executable components comprise:
    a security component that:
      in response to sending encrypted input data to a service provider that is remote from the system, receives an encrypted signature from the service provider that is generated based on an application of a homomorphic encryption public key and a homomorphic encryption equivalent defined function to the encrypted input data; and
      decrypts the encrypted signature with a homomorphic encryption private key that is paired with the homomorphic encryption public key to generate a decrypted signature; and a service provider application component, local to the system, that:
applies a defined function corresponding to the homomorphic encryption equivalent defined function on input data to generate a signature; and
in response to a determination that the signature matches the decrypted signature, grants the system access to a computation service of the service provider application component using the input data; and
the service provider application component performs the computation service on the input data in response to the granting the system access to the computation service.

2. The system of claim 1, wherein the security component encrypts the input data using the homomorphic encryption public key to produce the encrypted input data.

3. The system of claim 1, wherein the service provider application component, in response to a determination that the signature does not match the decrypted signature, denies the system access to the computation service to use the input data.

4. The system of claim 1, wherein the service provider application component grants the system access to the computation service to use the input data for a defined number of executions of the computation service.

5. The system of claim 1, wherein the computer executable components comprise an encryption component that generates the homomorphic encryption private key and the homomorphic encryption public key using a homomorphic encryption scheme.

6. The system of claim 5, wherein the homomorphic encryption scheme is non-symmetric.

7. The system of claim 1, wherein the defined function comprises mathematical operations selected from the group consisting of addition and multiplication.

8. The system of claim 1, wherein the input data is not provided to or accessible by the service provider.

9. The system of claim 1, wherein the security component sends the homomorphic encryption public key to the service provider.

10. The system of claim 1, wherein the security component scales the input data to whole integers prior to encrypting the input data and the service provider application component scales the input data to whole integers prior to executing the defined function on the input data.

11. The system of claim 1, wherein the service provider is a cloud computing system.

12. A computer-implemented method, comprising:
transmitting, by a device comprising a processor, a homomorphic encryption public key and homomorphically encrypted input data to a service provider;
receiving, by the device from the service provider, a homomorphically encrypted signature generated based on the homomorphic encryption public key, the homomorphically encrypted input data, and a homomorphic encryption equivalent defined function;
decrypting, by the device, the homomorphically encrypted signature using a homomorphic encryption private key to generate a decrypted signature;
generating, by the device, a signature using the defined function and the input data; and
in response to a determination, based on a defined function corresponding to the homomorphic encryption equivalent defined function, that the decrypted signature matches the signature, designating, by the device, the input data as valid for a computation service, and performing, by the device, the computation service on the input data.

13. The computer-implemented method of claim 12, further comprising encrypting, by the device, the input data using a homomorphic encryption public key to produce the homomorphically encrypted input data that secures the input data from visibility by the service provider.

14. The computer-implemented method of claim 12, further comprising in response to a determination that the decrypted signature fails to match the signature, designating, by the device, the input data as invalid for the computation service.

15. A computer program product for providing a local computation service for a client authorized by a remote service provider while keeping local client data private from the remote service provider, the computer program product comprising a computer readable storage medium having program instructions embodied therewith, the program instructions executable by a processing component on a device to cause the processing component to:
transmit a homomorphic encryption public key and homomorphically encrypted input data to a service provider located remotely from the device;
receive, from the service provider, a homomorphically encrypted signature generated based on the homomorphic encryption public key, the homomorphically encrypted input data, and a homomorphic encryption equivalent defined function;
decrypt the homomorphically encrypted signature using a homomorphic encryption private key to generate a decrypted signature;
generate a signature using the defined function and the input data; and
in response to a determination, based on a defined function corresponding to the homomorphic encryption equivalent defined function, that the decrypted signature matches the signature, designating, by the device, the input data as valid for a computation service, and perform the computation service on the input data.

16. The computer program product of claim 15, wherein the program instructions executable by the processing component further cause the processing component to:
in response to a determination that the decrypted signature fails to match the signature, designate the input data as invalid for the computation service.

17. The computer program product of claim 15, wherein the homomorphic encryption scheme is non-symmetric.

18. The computer program product of claim 15, wherein the defined function comprises mathematical operations selected from the group consisting of addition and multiplication.

19. The computer program product of claim 15, wherein the input data is not provided to or accessible by the service provider.

20. The computer program product of claim 15, wherein the designating the input data as valid for the computation service comprises designating the input data as valid for the computation service for a defined number of executions of the computation service.

* * * * *